United States Patent [19]

Noble et al.

[11] Patent Number: 5,962,051
[45] Date of Patent: *Oct. 5, 1999

[54] POLYMER PACKAGING

[75] Inventors: Philippe Noble, Creteil; Patrice Robichon, Chatou, both of France

[73] Assignee: Pernod Ricard, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/741,433

[22] Filed: Oct. 29, 1996

Related U.S. Application Data

[63] Continuation-in-part of application No. 08/598,018, Feb. 7, 1996, abandoned.

[30] Foreign Application Priority Data

Sep. 21, 1995 [FR] France ................................. 95 11104
Apr. 18, 1996 [FR] France ................................. 96 04854

[51] Int. Cl.$^6$ .................................................. B65D 85/72
[52] U.S. Cl. ........................ 426/106; 426/112; 426/665; 428/36.92
[58] Field of Search ................................. 426/106, 112, 426/665; 428/36.92

[56] References Cited

U.S. PATENT DOCUMENTS

| | | | |
|---|---|---|---|
| 3,862,288 | 1/1975 | Su | 264/235 |
| 3,940,001 | 2/1976 | Haefner et al. | 426/106 X |
| 3,963,399 | 6/1976 | Zavasnik | 425/526 |
| 4,054,630 | 10/1977 | Wang | 264/520 |

OTHER PUBLICATIONS

Lainchbury, David L.G., "High Nitrile Resins for Barrier Packaging," *An International Journal Author Reprint*, vol. 4, No. 1, pp. 39–49 (Rapra Tech. Ltd. 1991).

Matsui et al, J. Agric. Food Chem., 1992, 40, pp. 1902–1905.

Gilbert et al, Instrumental Analysis of Foods, 1983, vol. 1, pp. 405–411.

Benet et al, Analysis, 1992, 20, pp. 391–396.

Mannheim et al, Food and Packaging Interactions, 1988, Chap. 6, pp. 68–82.

*Primary Examiner*—Leo B. Tentoni
*Attorney, Agent, or Firm*—Foley & Lardner

[57] ABSTRACT

The invention relates to long-life polymer packaging containing a fruit-based and/or vegetable-based drink, which packaging consists of a monolayer and which monolayer is formed of a methyl acrylate/acrylonitrile/butadiene terpolymer. The invention also relates to a process intended to limit the degradation of fruit-based and/or vegetable-based drinks contained in a polymer packaging, which packaging is in the form of a monolayer and consists of a methyl acrylate/acrylonitrile/butadiene terpolymer.

16 Claims, 1 Drawing Sheet

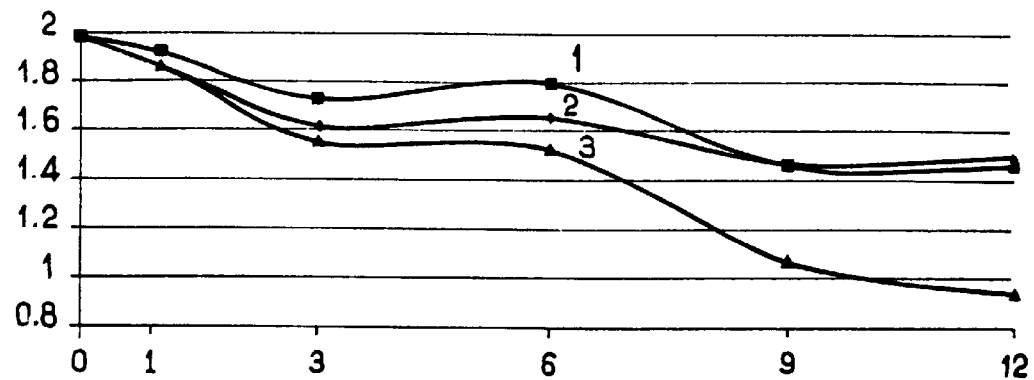
FIG_1
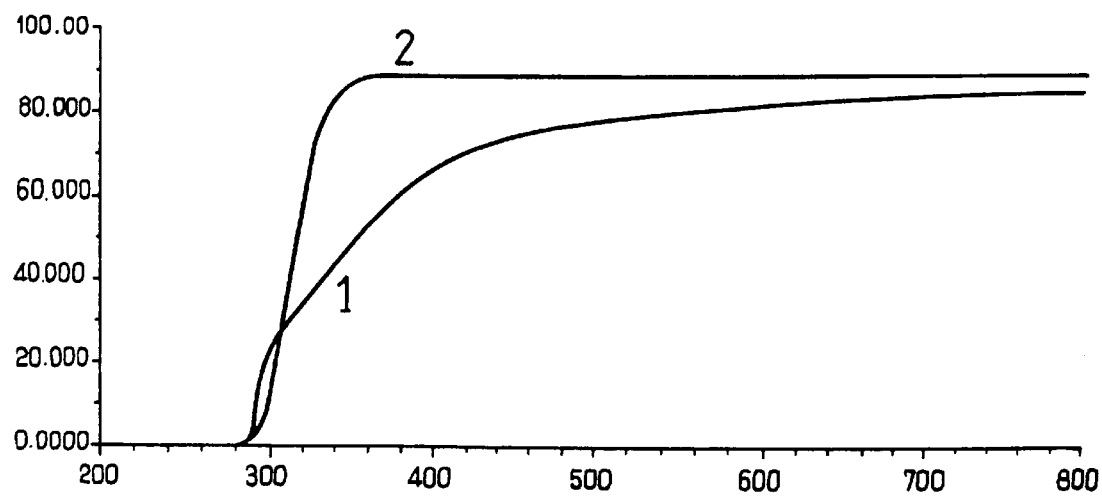
FIG_2

POLYMER PACKAGING

This application is a continuation-in-part of application Ser. No. 08/598,018, filed Feb. 7, 1996, now abandoned.

FIELD OF THE INVENTION

The present invention relates to novel long-life polymer packaging containing a fruit-based and/or vegetable-based drink. The invention also relates to the use of a polymer film for the production of packaging in contact with fruit-based and/or vegetable-based drinks so as to limit the degradation of these drinks, and to a process intended to limit the degradation of fruit-based and/or vegetable-based drinks contained in polymer packaging.

BACKGROUND

Packaging for fruit-based and/or vegetable-based drinks must firstly conserve the organoleptic qualities of these beverages. Glass packaging is to date the packaging most commonly used, for its gas-barrier properties, but most especially for its high chemical inertness. The general tendency, however, is to replace this material by polymers, which have well known advantages in various respects: lightness, unbreakability.

However, the use of such packaging has hitherto been limited, on account of the drawbacks presented, in particular the loss of organoleptic qualities over time, associated both with the permeability and also with physicochemical interactions between the flavors and the polymer.

Indeed, the use of polymer to package food products often leads to contents/container interaction problems.

These problems are commonly described in the literature and are essentially:

Scalping: i.e. adsorption of constituents of the food on the surface of the material. This leads to a lowering in aromatic intensity and, if the adsorption is selective, to a change in the flavor and the taste. This phenomenon, governed by the partition coefficients of these substances between the food and the material, will be even greater in the case of aqueous foods such as fruit juices.

Absorption: after the adsorption, there may be absorption of the flavorings by the polymer, diffusion into the polymer and then desorption on the outer face. Here also, there will be either a loss or a change in the aromatic intensity.

The chemical reaction between the flavoring and the polymer:

It being [sic] possible for the polymer to be both a reactant and a catalyst. The following experiment demonstrates this phenomenon: a model solution of about ten flavorings was placed in contact with a polymer (PP). Gas chromatographic analysis showed that many more substances than the ten or so initially present were then found.

Similarly, a fruit and/or vegetable juice contained in packaging made of polyethylene terephthalate (PET) does not withstand a six-month aging test. Premature oxidation of the packaging is observed in particular.

In order to avoid this drawback, multilayer packaging consisting of an inner layer of an ethylene/vinyl alcohol copolymer coated on either side with a polyethylene film via an intermediate binder has been proposed. However, such packaging is opaque or, in the extreme case, exhibits contact transparency if the polyethylene material is replaced by polypropylene.

Moreover, the extrusion processes used for such packaging are complex, thereby increasing the cost price of this packaging.

Multilayer packaging consisting of an inner layer of nylon (PA) or of an ethylene/vinyl alcohol copolymer coated with two outer layers made of polyethylene terephthalate obtained by a process of co-injection blowing has also been proposed. However, this packaging has a very high cost price owing to difficulties in its manufacture, and is currently virtually abandoned.

Monolayer packaging based on polyethylene naphthalate (PEN), which has excellent qualities of storage and transparency, has also been proposed. However, this packaging is also very expensive, thus limiting its development.

Monolayer packaging based on a PET+PA (polyamide)+cobalt salts alloy, which has excellent qualities of storage and transparency as well as oxygen-absorbing properties, has also been proposed. However, it has never been possible to demonstrate the application of this material in the food sector.

Moreover, it is well known to use a methyl acrylate/acrylonitrile/butadiene copolymer marketed under the trade name Barex 210® (supplied by the company B.P. Chemicals) for its gas-barrier properties. Such a material has thus already been used as a container for fizzy drinks, as is the case, for example, in U.S. Pat. Nos. 3,862,288, 3,963,399 and 4,054,630.

However, it should be pointed out that the gas-barrier properties are entirely different from those relating to the chemical inertness toward the flavorings. As shown by the many publication [sic] mentioned below, this problem, long after the filing of the abovementioned American patents, was not solved.

Mannheim et al., Food and Packaging Interactions, 1988, chap. 6, pages 68–82 studies the interaction between lemon-based products and laminar structures such as polyethylene, polyethylene vinyl alcohol, surlyn (ionomeric resin) and linear low density polyethylene.

Gilbert et al., Instrumental Analysis of Foods, 1983, vol. 1, pages 405–411 study the barrier properties of polymer films toward various aromatic vapors (polypropylene, PVDC, polyethylene).

Matsui et al., J. Agric. Food Chem. 1992, 40, 1902–1905, study the sorption of flavorings by packaging films such as medium density polyethylene and polyethylene vinyl alcohol.

Benet et al., Analysis, (1992) 20, 391–396 studies the interaction of high density polyethylene stoppers with airborne organic substances.

SUMMARY OF THE INVENTION

The object of the present invention is to propose novel polymer-based packaging which makes it possible to conserve the organoleptic qualities of fruit-based and/or vegetable-based drinks for a very long period, while at the same time having the other following qualities:

transparency, low manufacturing cost.

The polymer packaging according to the invention consists of a monolayer and in that the monolayer is formed of a methyl acrylate/acrylonitrile/butadiene terpolymer.

BRIEF DESCRIPTION OF THE DRAWINGS

FIG. 1 represents the change in the proportion of total reductive species in micrograms/liter as a function of time for samples described in Example 1.

FIG. 2 represents the transmittance of Examples 1 and 2 as a function of the wavelength as described in Example 6.

DETAILED DESCRIPTION

The expression "fruit-based and/or vegetable-based drinks" is generally understood to refer to juices, diluted juices and flavored drinks based on fruit and/or vegetables.

In the context of the present description, the expression "fruit and/or vegetable juice" will be understood to refer to the aqueous dispersions resulting from the pressing, by any suitable means, of the material present inside fruit and/or vegetables, optionally after the treatments commonly used in the industry concerned, in particular microbiological stabilization treatments (pasteurization, sterilization, addition of preserving agent), dilution treatments, filtration treatments, etc. In order of quality, mention will be made of pure juices, juices based on concentrate, and nectars.

The expression "fruit-flavored and/or vegetable-flavored drinks" will be understood to refer in particular to reconstituted drinks containing one or more natural or synthetic flavors.

Among the fruit-based drinks which may be mentioned are drinks based on orange, lemon, tomato and grapefruit.

Among the vegetable-based drinks which may be mentioned are drinks based on:

| | |
|---|---|
| celery | carrot |
| lettuce | red beetroot |
| artichoke | onion |
| brussels sprout | asparagus |
| capsicum | cauliflower |
| salsify | spinach |
| green cabbage | broccoli |
| leek | garden pea |
| aubergine | courgette |
| common beet | fennel |
| turnip | pumpkin |
| green bean | |

Among the mixtures of the various fruit and vegetables which may be mentioned, without any limitation being implied, are the following mixtures:

carrot-lemon tomato, carrot, celery, lemon, red beetroot, lettuce, onion tomato, celery, lemon carrot, orange tomato, carrot, celery, lemon, red beetroot, grapefruit, orange.

The said drinks may also be mixed with milk or derivatives thereof.

The term "packaging" will be understood to refer to any container likely to contain the drink, whether this is in the form of a bottle, a carton or other equivalent closed systems, including bags and leather bottles.

Among the terpolymers which are suitable for use in the context of the present invention, those having an oxygen permeability of less than 0.8 cm$^3$·mm/m$^2$·day·10$^5$ Pa (1 bar=10$^5$ Pa) at 23° C. and at a relative humidity of 100% will be preferred.

These materials are available on the market or may be obtained by a person skilled in the art, in a known manner.

The terpolymer preferably has a butadiene content of between 8 and 20%.

The terpolymer is advantageously chosen from the group consisting of the terpolymer whose butadiene content is about 10% or the terpolymer whose butadiene content is about 18%.

These polymers are marketed by the company BP Chemicals under the tradenames Barex 210® and Barex 218® respectively.

The polymer Barex 210® has an oxygen permeability of 0.3 cm$^3$·mm/m$^2$·day·10$^5$ Pa at 23° C.

The polymer Barex 218® has an oxygen permeability of 0.6 cm$^3$·mm/m$^2$·day·10$^5$ Pa at 23° C.

These polymers are already used as packaging for various products such as cosmetics items, domestic chemical products and articles for medical use.

They are also used for certain consumable products such as table oils, essential oils, spices and vinaigrette sauces. However, all the products which have to date been packaged by such polymers do not require the conservation of flavors which belong to fruit and/or vegetable juices.

In effect, the problem of the packaging of fruit-based and/or vegetable-based drinks is a specific problem on account of the essentially aqueous nature of the liquid in which the substances, in particular aromatic substances, are present.

Since essential oils are sparingly soluble in water, they have a tendency to migrate in polymers, the consequences of which are:

a general decrease in the aromatic intensity due to the sorption of the mixture of aromatic compounds, a modification of the flavor, due to preferential sorptions of certain constituents of the flavor, a degradation of the constituents of the flavor with formation, on contact with the polymer, of new molecules which denature the organoleptic profile of the product. This may occur either by direct chemical reactions with the substrate or by reactions catalyzed by the substrate.

These phenomena are all the larger in the case of drinks when the flavors are very sparingly soluble in water and have, on the other hand, a strong affinity for the polymers.

The implementation of such polymers is carried out on a usual extrusion-blowing machine such as that used for PVC with or without bi-orientation.

Such an implementation is thus inexpensive, not requiring the use of a machine which is specific for the product.

The packagings are thus in the form of a monolayer material obtained by extrusion. The thickness of the monolayer varies according to the nature of the packaging, but will preferably be between 200 and 500 µm.

It is advantageously between 300 and 400 µm but may go as low as 50 µm for films and be up to 1 mm or more for large containers (barrels etc.).

The packaging according to the invention can store a fruit-based and/or vegetable-based drink such as a fruit and/or vegetable juice for 12 months under the same conditions as a glass bottle, that is to say without substantial degradation of the organoleptic qualities.

Moreover, they are transparent, easy to transform and are cheap.

The invention also relates to the use of a methyl acrylate/acrylonitrile/butadiene terpolymer as described above in monolayer form for the production of packaging in contact with fruit-based and/or vegetable-based drinks, so as to limit the degradation of these drinks.

The invention also relates to a process intended to limit the degradation of fruit-based and/or vegetable-based drinks contained in polymer packaging, characterized in that the said packaging is in the form of a monolayer and consists of a methyl acrylate/acrylonitrile/butadiene terpolymer as described above.

The invention is now illustrated by the examples which follow, which are given by way of illustration.

EXAMPLE 1

Bottles consisting of a monolayer of Barex 218® marketed by the company BP Chemicals, with an average thickness of 350 µm, were made by transformation on a machine for the bi-orientation extrusion-blowing of PVC.

The bottles are filled with a cold Pampryl® brand orange juice after flash pasteurization and addition of a bacteriostat. The juice was de-aerated beforehand by bubbling nitrogen through before flashing, and the bottles are flushed with nitrogen before withdrawal. The initial dissolved oxygen is thus very low, less than 0.5 ppm.

EXAMPLE 2 (COMPARATIVE)

A glass bottle similar in shape to that of Example 1 was filled in the same manner with the above-mentioned orange juice. The average thickness of the glass is 3 mm.

EXAMPLE 3 (COMPARATIVE)

A polyethylene terephthalate bottle similar in shape to that of Example 1 was filled, according to the same method, with the abovementioned orange juice. The average thickness of the bottle is 300 µm.

All the bottles are stoppered with a cap which has a PE/ALU/PE joint.

Several physicochemical tests were performed on the bottles of Examples 1, 2 and 3 in order to evaluate the properties of the various packagings.

EXAMPLE 4—ORGANOLEPTIC PROFILE

The bottles are left for 12 months at 20° C. and the organoleptic qualities are measured after this interval. The juice packaged in polyethylene terephthalate (Example 3) is rejected, with dominant cooked and oxidized notes. In addition, a decrease in the aromatic intensity and a loss of the ORANGE typicity are observed.

The orange juice packaged according to Example 1 is not significantly different from the orange juice packaged in glass (Example 2) which constitutes the reference.

EXAMPLE 5—CHANGE IN THE REDOX POTENTIAL

The attached FIG. 1 represents the change in the proportion of total reductive species in micrograms/liter as a function of time for samples taken 1, 3, 6, 9 and 12 months after the start of the test. A similar change is noted between the packaging of Example 1 (according to the invention) and of Example 2 (glass), whereas the packaging of Example 3 (PET) exhibits a very large amount of slippage after aging for six months, thereby indicating a very high level of oxidation.

This test is in excellent correlation with the change in organoleptic qualities as measured in Example 4.

EXAMPLE 6—PHOTO-AGING TEST

Since the photosensitivity of juices is a very important factor, which determines the quality of these juices, the barrier properties of the packaging materials of Examples 1 and 2 were evaluated under ultraviolet and the results are given in the attached FIG. 2, in which the transmittance is given as a function of the wavelength.

The packagings are exposed for 48 hours and 7 days respectively to sunlight and are compared with a glass packaging stored in the dark (control).

After exposure to ultraviolet for 7 days, the juice packaged according to Example 1 becomes more terpenic, but the cooked and oxidized notes are not more pronounced than in the control. The juice packaged according to Example 2 loses its ORANGE and is the one most adversely affected.

We claim:

1. A long-life polymer packaging containing a fruit-based and/or vegetable-based aqueous dispersion resulting from the pressing of the material present inside fruit and/or vegetable, which packaging comprises a monolayer and which monolayer is formed of a methyl acrylate/acrylonitrile/butadiene terpolymer.

2. The packaging as claimed in claim 1, wherein the methyl acrylate/acrylonitrile/butadiene terpolymer has an oxygen permeability of less than 0.8 $cm^3 \cdot mm/m^2 \cdot day \cdot 10^5$ Pa at 23° C. and at a relative humidity of 100%.

3. The packaging as claimed in claim 1, wherein the terpolymer has a butadiene content of between 8 and 20%.

4. The packaging as claimed in claim 3, wherein the terpolymer is chosen from the group consisting of the terpolymer whose butadiene content is about 10% and the terpolymer whose butadiene content is about 18%.

5. The packaging as claimed in claim 1, wherein the monolayer has a thickness of between 200 and 500 µm.

6. The packaging as claimed in claim 1, wherein it is in the form of a bottle.

7. The packaging as claimed in claim 1, wherein said fruit-based and/or vegetable-based aqueous dispersion resulting from the pressing of the material present inside fruit and/or vegetable is selected from the group consisting of pure juices, juices based on concentrate, and nectars of fruit and/or vegetables.

8. The packaging as claimed in claim 1, wherein said fruit-based and/or vegetable-based aqueous dispersion resulting from the pressing of the material present inside fruit and/or vegetable is selected from the group consisting of fruit-flavored and/or vegetable-based drinks.

9. The packaging as claimed in claim 1, wherein the fruit-based drink is based on orange, lemon, tomato, grapefruit or a mixture thereof.

10. The packaging as claimed in claim 1, wherein said vegetable-based aqueous dispersion resulting from the pressing of the material present inside fruit and/or vegetable is selected from the group consisting of:

celery, carrot, lettuce, red beetroot, artichoke, onion, brussels sprout, asparagus, capsicum, cauliflower, salsify, spinach, green cabbage, broccoli, leek, garden pea, aubergine, courgette, common beet, fennel, turnip, pumpkin, and green bean, or a mixture thereof.

11. The packaging as claimed in claim 1, wherein said fruit-based and/or vegetable-based aqueous dispersion resulting from the pressing of the material present inside fruit and/or vegetable is a mixture selected from the group of mixtures consisting of:

carrot and lemon; tomato, carrot, celery, lemon, red beetroot, lettuce, and onion; tomato, celery, and lemon; carrot and orange; and tomato, carrot, celery, lemon, red beetroot, grapefruit and orange.

12. A method for limiting the degradation of a fruit-based and/or vegetable-based aqueous dispersion resulting from the pressing of the material present inside fruit and/or vegetable, comprising packaging said aqueous dispersion in a packaging comprising a monolayer wherein said monolayer is formed of a methyl acrylate/acrylonitrile/butadiene terpolymer.

13. The packaging as claimed in claim 1, wherein said fruit-based and/or vegetable-based aqueous dispersion resulting from the pressing of the material present inside fruit and/or vegetable comprises milk or derivatives thereof.

14. The method according to claim 12, wherein said fruit-based and/or vegetable-based aqueous dispersion is packaged in said packaging for at least 6 months.

15. A method for conserving the organoleptic qualities of a fruit-based and/or vegetable-based aqueous dispersion resulting from the pressing of the material present inside fruit and/or vegetable, comprising packaging said aqueous dispersion in a packaging comprising a monolayer wherein said monolayer is formed of a methyl acrylate/acrylonitrile/butadiene terpolymer.

16. The method according to claim 15, wherein said fruit-based and/or vegetable-based aqueous dispersion is packaged in said packaging for at least 6 months.

* * * * *